Dec. 6, 1960     E. W. VERES     2,963,163
FILTER UNIT AND METHOD OF MAKING
Filed Oct. 11, 1957
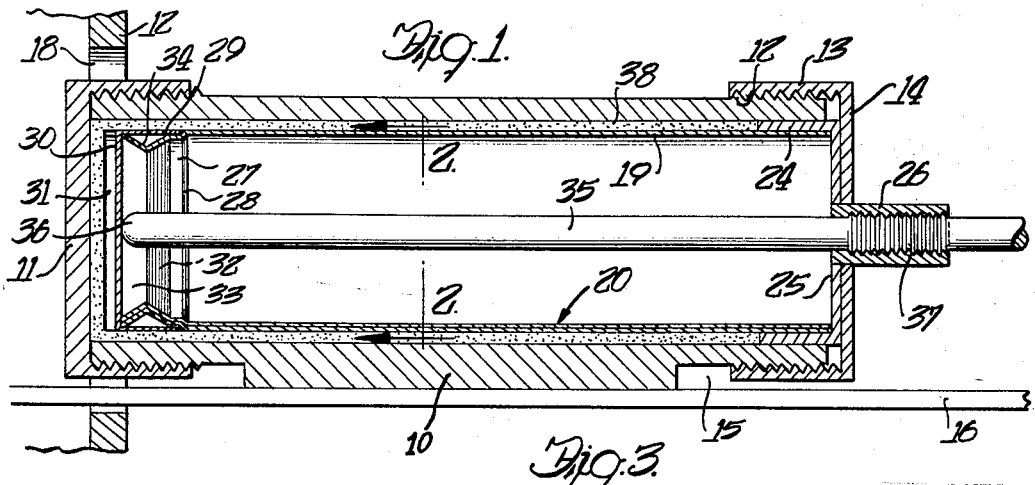
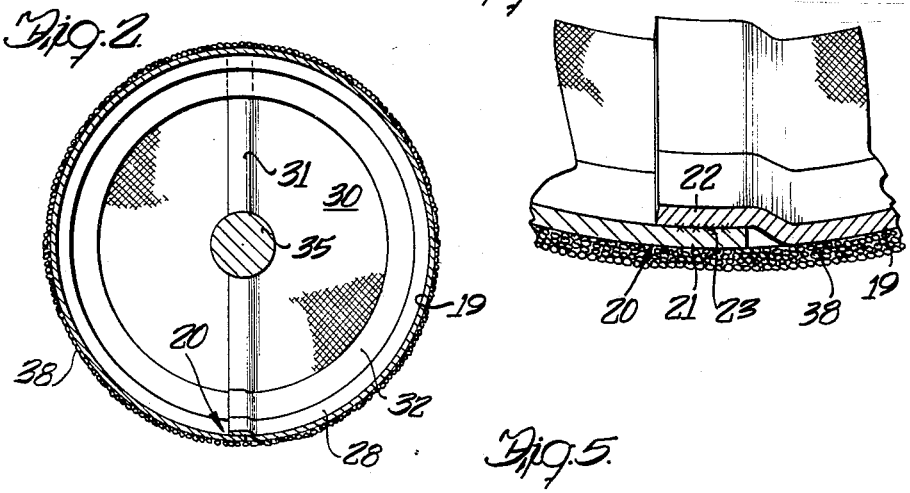
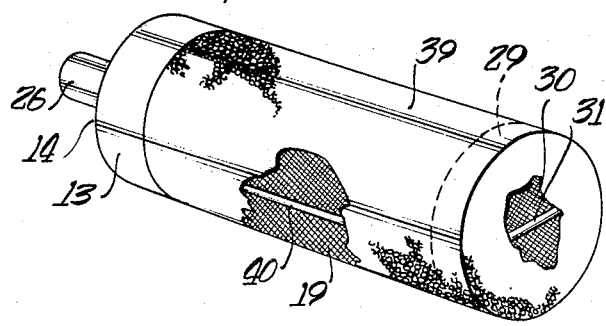
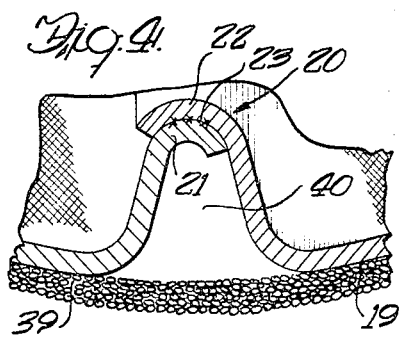
Inventor
Edward W. Veres
John W. Graham
Attorney

United States Patent Office 2,963,163
Patented Dec. 6, 1960

2,963,163

FILTER UNIT AND METHOD OF MAKING

Edward W. Veres, Arlington Heights, Ill., assignor to Arrow Tools, Inc., Chicago, Ill., a corporation of Illinois Filed Oct. 11, 1957, Ser. No. 689,506

12 Claims. (Cl. 210—496)

This invention relates to filter units and to a method of making the same, and more particularly to a sintered metal filter and fabricating method therefor.

In my copending patent application, Serial No. 625,135, filed November 29, 1956 (now patent No. 2,877,903), of which this application is a continuation-in-part, there is disclosed a sintered metal filter comprising a wire screen carrier of tubular configuration having a coating of sintered metal particles bonded thereto and equipped with end caps. Also disclosed in that parent application is a method of making such filter unit, which embodies the use of the metal screen carrier as a mold member whereby that member serves a dual function—that is, a mold element and a structural member of the completed filter unit.

The present invention constitutes an improvement over the method and structure disclosed in the parent application; and consequently, the provision of such improvement is one of the objects of this invention. Another object of the ivention is to provide a filter unit comprising a composite wire screen carrier and a sintered metal coating bonded thereto, wherein provision has been made for the unequal expansion of the dissimilar metal screen and coating caused in the fabrication of the unit.

Still another object of the invention is that of providing a filter unit and method of making the same, comprising a metal screen carrier and a sintered metal coating thereabout wherein free expansion in longitudinal and transverse directions is provided for the screen carrier independently of the sintered metal coating therefor, and prior to the bonding of the sintered metal thereto. Yet another object is in the provision of a sintered metal filter of the type described and method of making the same, wherein the sintered metal is bonded to the wire screen after the latter has expanded whereupon the filter is stress-loaded after the cooling thereof which lends structural strength thereto.

Yet a further object is to provide a filter unit of the character described and method of fabricating the same, wherein the screen carrier is configurated in a particular manner prior to the heating and bonding of the sintered metal coating thereto—such configuration permitting free expansion during the sintering process, but also serving to strengthen the screen so as to avoid unwanted deformation in the sintering process. Additional objects and advantages of the invention will become apparent as the specification develops.

An embodiment of the invention, both as to method and structure, is illustrated in the accompanying drawing, in which—

Figure 1 is a longitudinal sectional view of a mold or die having the filter components positioned therein, just as the mold is about to enter a furnace or oven; Figure 2 is a transverse sectional view taken along the line 2—2 of Figure 1; Figure 3 is an enlarged, broken vertical sectional view similar to that of Figure 2, but showing only a seam of the screen carrier prior to the heating thereof in the oven; Figure 4 is an enlarged, broken vertical sectional view identical to that of Figure 3, but showing the seam of the screen carrier after the sintering operation; and Figure 5 is a perspective view illustrating a completed filter unit made in accordance with the invention.

The assembly illustrated in Figure 1 comprises a generally cylindrical die or mold 10, preferably formed of carbon or graphite because of the low cost and durability thereof. However, other materials could be employed which have the characteristic of giving long life when subjected to the repetitive temperature elevations necessitated by the passage thereof through a sintering oven or furnace. The die 10 has a removable closure cap 11 threadedly secured thereon at one end, and at its other end is provided with external threads 12 which mate with the internal threads of a skirt or flange 13 provided by a closure cap 14. Preferably, the die or mold 10 is recessed at each end along the bottom thereof (as shown at 15); and desirably, the mold is flattened or otherwise equipped with means therealong that permit it to seat firmly on a conveyor 16 which advances the same through a furnace or oven, designated in general with the numeral 17, having an opening 18 in a wall thereof to permit the conveyor 16 and articles carried thereby to be moved thereinto.

The furnace 17 may be wholly conventional and functions to elevate the temperature of the mold 10 and contents thereof as the conveyor 16 advances the same therethrough. Since such furnaces are well known in the art, no further description thereof will be set forth.

Positioned within the mold 10 is a cylindrical wire screen carrier 19 of circular cross section, formed from a flat sheet of screening curved into the desired configuration and constrained therein by a seam 20 formed by the overlapping longitudinal edges 21 and 22 of the screen (see Figure 3) which are welded together, as shown at 23. At one end, the screen carrier 19 is open, and is telescopically received within a skirt or flange 24 provided by a metal end cap 25 having a central opening that receives an internally threaded nipple or coupling 26. The coupling 26 is rigidly affixed to the cap 25, and projects outwardly through an opening provided therefor in the closure cap 14 of the mold 10. It is apparent that the outer diameter of the skirt 24 is such that it is snugly received within the mold 10, and in turn snugly receives the end portion of the screen 19 therein.

At its opposite end, the screen 19 is stepped inwardly as shown at 27, and defines a shoulder 28 abutted by the edge of the flange or skirt 29 provided by an end cap 30 which is formed of metal wire screening the same as the carrier screen 19. In order to stiffen the end cap 30, and at the same time permit free expansion thereof, a vertically extending channel or inwardly projecting groove 31 is provided thereacross which is generally perpendicular to the seam 20, as is more evident from Figures 2 and 5.

The screen carrier 19 adjacent the end thereof received within the flange of the cap 30 is pressed inwardly to form an inwardly inclined, annular wall portion 32 that merges with an outwardly inclined wall portion 33, which define therebetween a generally V-shaped groove or recess 34 extending circumferentially about the carrier adjacent the stepped portion 27. Extending into the mold is a reinforcing rod 35 having an arcuate end 36 that bears against the rib 31 of the end cap at a restricted point of engagement therewith, and is threaded as shown at 37 so as to engage the corresponding threads of the coupling 26 which thereby maintains the rod 35 in the position shown in Figure 1. The rod prevents inward buckling of the cap 30 when the mold and its contents are heated within the oven 12.

Also contained by the mold 10 is a mass 38 of sintered metal particles which are confined between the walls of the mold and the screen carrier 19 and end cap 30 therefor. This mass of particles is also contiguous with the inner edge of the flange-equipped end cap 25. The individual particles or pellets which comprise the mass 38 may be copper or bronze particles coated or sheathed in tin, and may be characterized as having generally spherical configurations. The particles are not necessarily spherical, but in the sense that they do have relatively smooth, arcuate surfaces which provide point contacts therebetween, they may for convenience be considered as spherical. Preferably, the particles have at least one dimension which is greater than the size of the openings in the screen carrier 19 and screen cap 30 therefor, so as to prevent migration of the particles therethrough. Ordinarily, the mass 38 will constitute two to three layers of particles, although the precise number of layers is not critical and will depend upon the filtering characteristics demanded of the unit.

When the cylindrical screen carrier 19 is formed, the longitudinal edges 21 and 22 are overlapped as shown in Figure 3 to form the seam 20, and are secured in such overlapping relation by a continuous weld or a series of spaced spot welds therealong, and the seam is relatively flat, as Figure 3 illustrates. On the other hand, during the heating step that occurs within the oven 12, and which is provided to bond the individual sintered metal particles to each other and to the other components of the filter, the seam 20 buckles upwardly and inwardly as shown in Figure 4, with the result that an inwardly projecting rib extends longitudinally along the screen 19. Apparently, the welding of the seam makes the screen carrier quite malleable therealong so that when the carrier tends to expand diametrically during the heating thereof, it yields or buckles inwardly along the seam to permit free expansion.

The seam is oriented along the bottom of the mold 10; and consequently, the mass 38 of sintered metal particles does not in any way interfere with this inward buckling of the seam; and following a sintering operation, the coating on the screen in the area of the seam is seen to have the form shown in Figure 4—that is, the body of bonded particles defining the coating (denoted by the numeral 39 to distinguish it from the unbonded mass 38) maintains an arcuate configuration and remains outside of the channel 40 formed by the inwardly buckled seam.

Free expansion of the screen carrier along the longitudinal axis thereof is provided by the inwardly pressed portions which define the circumferential recess 34. Similarly, the rib 31 in the end cap which functions to reinforce the seam, also permits substantially free expansion of the cap. Consequently, the arrangement disclosed affords relatively free expansion of the wire carrier and wire end cap therefor independently of the body of sintered metal particles enclosing the same.

This is advantageous for most frequently the sintered metal particles and the wire screening will be made of different metals, with the result that they will have different coefficients of expansion. It has been found that a temperature of about 1,600° F. is necessary in order to assure a good bond of the metal particles to each other and to the screening material; and before this temperature is reached, it appears that the wire screening has expanded to substantially its full extent. When the particles are bonded thereto, the screening then is fully expanded with the result that when the unit is cooled, the screening is placed under stress. This is an advantageous result in that the stressed character of the screening serves to stiffen and reinforce the structure, thereby making a more durable and longer lasting unit. In addition, the sintered metal coating 39 about the screening has a uniform thickness and is not distorted or full of voids, as could be the case if provision were not afforded for free expansion of the screen carrier. Consequently, a filter unit formed in accordance with the invention has superior and uniform filtering capacity throughout the entire extent thereof.

A filter unit after completion is illustrated in Figure 5, and may be used in a variety of environments. For example, it may be used as a sump filter, in which case it is submerged within a reservoir receiving incoming fluid, and the coupling 26 thereof is connected to the outflow line from the sump. A further description of such a use is set forth in my copending application referred to hereinbefore, and reference may be made thereto if additional information is desired.

The procedure I prefer to follow in forming the filter is, first, to place the metal end cap 24 in position with respect to the end closure cap 14, and to then thread the closure 14 onto the end of the mold 10. Next, the screen 19 and screen cap 30 are assembled, and the unit dropped into the mold through the open end thereof afforded by the removal of the closure cap 11. Following this, the mass of sintered metal particles 38 is dropped into the mold in surrounding relation with the screen 19 and cap 30, and the mold closed by threading the cap 11 thereonto. Thereafter, the reinforcing rod 35 is inserted into the interior of the mold, and screwed in place by engaging the threads 37 thereof with the internal threads of the nipple 26. As stated hereinbefore, the seam 20 of the screen should be oriented along the bottom of the mold 10, as shown in Figure 1.

The threads 37 are relatively loose and permit the escape of gases therethrough which may develop within the interior of the closed mold 10. It will be noted in Figure 1 that the mold 10 in entering the furnace 12, moves toward the left so that the last portion of the mold to pass through the entrance 18 of the furnace constitutes the nipple 26 and loose threads 37. Consequently, as the mold is progressively heated, the resultant gases developed within the interior thereof (which inherently expand toward the coolest part of the mold) flow outwardly therefrom past the threads 37 as part of this natural expansion.

The mass of particles 38 has been referred to herein as comprising sintered metal particles since this reference is convenient, and because sintering procedures are most frequently thought of in terms of particulate metals. However, materials other than metals—such as nylon or other plastics, for example—are contemplated by this invention, and the term "sintering" is employed in its fundamental sense to mean the uniting of smaller particles into a larger body by the application of heat thereto. It may be noted that the perforate carrier 19 should have a melting temperature that exceeds the sintering temperature of the particles employed.

The filter unit which is made in accordance with this invention, is functionally superior to sintered filters heretofore made for the reason that the same degree of filtering is attained with a smaller pressure drop thereacross. This is apparent if it is remembered that the primary filtering action occurs at the surface of the filter and, consequently, a thin layer of filtering material is all that is necessary to attain the requisite filtering action. However, it has in the past been necessary to have multiple layers of sintered particles in order to obtain sufficient structural strength in the unit. As a result, the pressure drop across the filter increased in proportion to the number of layers employed without substantially altering the filtering characteristics thereof. With the present invention, a thin coating of sintered particles is all that is required, for the structural strength is provided by the perforate or wire screen carrier.

Moreover, sintered particles are quite expensive, and minimizing the quantity needed in each filter substantially reduces the cost thereof. The cost is also decreased because the filter is an integral unit when it leaves the sintering furnace. That is to say, following the sintering process, it is not necessary to assemble end caps, connectors or other elements thereto. In addition, a dual function is ascribed to the screen 19 and cap 30 in that these members initially serve as an inner mold to confine the mass of particles during the sintering process, and thereafter become a structural part of the completed filter. It may be noted that the process affords great versatility with respect to the shapes of integral filters which can be made. For example, the process would permit an integral spherical filter to be fabricated, and this of course is impossible where conventional molding or sintering techniques are employed, using inner mold forms that must be removed at the termination of the molding process.

While in the foregoing specification an embodiment of the invention has been described in terms of a method and apparatus in considerable detail for the purpose of illustration, it will be apparent to those skilled in the art that changes may be made in such details without departing from the spirit and principles of the invention.

I claim:

1. In a sintered particle filter unit of the character described, a hollow perforate carrier having overlapping edges defining a longitudinally extending seam, said seam being buckled inwardly to form a rib and coextensive channel extending longitudinally of the carrier with said channel being disposed along the outer surface thereof, a sintered particle coating enclosing said carrier and comprising a mass of particles bonded by the application of heat to each other and to said carrier, and end caps for said integrated carrier and coating, said channel being effective to accommodate expansion of said carrier during bonding of said particles so as to provide a substantially fixed diameter of said carrier during such bonding.

2. The filter structure of claim 1 wherein said channel defined by said inwardly buckled seam is substantially unfilled by said coating, and in which said coating extends over and covers the channel formed by said rib.

3. The filter structure of claim 1 in which said carrier has a depressed area intermediate the ends thereof defining a circumferentially extending channel thereabout.

4. In a filter of the character described, an elongated wire screen carrier having overlapping edges defining a longitudinally extending seam, said edges being welded together to maintain said carrier in a generally cylindrical configuration and said carrier being relatively malleable adjacent said seam, a wire screen cap closing one end of said carrier, a coating enclosing substantially all of said carrier and cap and comprising a mass of particles bonded to each other and to said carrier and cap and thereby securing the cap to the carrier, and a closure for said carrier at the opposite end thereof, said carrier being bowed inwardly along said seam and defining both an inwardly projecting, longitudinally extending rib and coextensive channel.

5. The filter structure of claim 4 in which said screen cap has an inwardly projecting rib extending transversely thereacross.

6. The filter structure of claim 5 in which said carrier has an inwardly depressed portion intermediate the ends thereof defining a circumferentially extending channel.

7. The filter structure of claim 4 in which said particles are sintering particles and said bond is effected by heat applied to the particles, and in which said carrier and screen cap are stressed and are maintained in such stressed condition by the sintered metal coating bonded thereto.

8. In a method of making a sintered particle filter, the steps of overlapping the longitudinal edges of a screen carrier and uniting the same to maintain said carrier in a generally cylindrical configuration and conditioning said carrier along said edges to make the carrier relatively malleable thereat, confining a coating of sintered particles about said carrier, and elevating the temperature of said carrier and coating to deflect said seam inwardly and thereafter continuing the elevation of the temperature to bond said particles to each other and to said carrier, whereby when said coating and carrier are cooled, said carrier is maintained in a stressed condition with said seam deflected inwardly.

9. In a method of making a sintered metal filter having a wire screen carrier, the steps of securing the longitudinal edges of said carrier in overlapped relation and annealing the same to form a relatively malleable section extending longitudinally along said carrier, confining a mass of sintered metal particles about said carrier and in contiguous relation therewith, elevating the temperature of said carrier to effect a transverse expansion thereof and an inward deflection of said malleable section, and further elevating the temperature of said carrier and particles thereabout to effect a bonding of the particles to each other and to said carrier.

10. In a sintered particle filter unit, a hollow malleable screen having a substantially continuous perimetric surface and defining a carrier, said carrier being deformed along a longitudinally extending line to define a laterally projecting rib on one side thereof and a coextensive channel on the other side thereof, said channel being effective to accommodate elongation of said carrier along a perimetric line extending thereabout without a corresponding increase in width so as to enable said carrier to have substantially determinate cross sectional dimensions when subjected to sintering temperatures, and a particulate coating extending over the perimetric surface of said carrier and comprising a mass of particles sintered to each other and to said carrier.

11. The filter unit of claim 10 in which said rib extends inwardly from the perimetric surface of said carrier.

12. The filter unit of claim 11 in which said carrier is a wire screen, and in which said particles are metal.

References Cited in the file of this patent

UNITED STATES PATENTS

| | | |
|---|---|---|
| 2,826,309 | Forman et al. | Mar. 11, 1958 |
| 2,877,903 | Veres | Mar. 17, 1959 |